(12) United States Patent
Laramay et al.

(10) Patent No.: US 10,934,827 B2
(45) Date of Patent: Mar. 2, 2021

(54) IN SITU IN-LINE REACTOR FOR REMEDIATION OF GROUNDWATER CONTAMINANTS

(71) Applicants: Fiona Laramay, Norwood, NY (US); Michelle Crimi, Potsdam, NY (US)

(72) Inventors: Fiona Laramay, Norwood, NY (US); Michelle Crimi, Potsdam, NY (US)

(73) Assignee: CLARKSON UNIVERSITY, Potsdam, NY (US)

( * ) Notice: Subject to any disclaimer, the term of this patent is extended or adjusted under 35 U.S.C. 154(b) by 99 days.

(21) Appl. No.: 16/251,801

(22) Filed: Jan. 18, 2019

(65) Prior Publication Data

US 2019/0226315 A1 Jul. 25, 2019

Related U.S. Application Data

(60) Provisional application No. 62/619,671, filed on Jan. 19, 2018.

(51) Int. Cl.
*E21B 43/00* (2006.01)
*E21B 43/30* (2006.01)
*C02F 103/06* (2006.01)

(52) U.S. Cl.
CPC ........ *E21B 43/305* (2013.01); *B09C 2101/00* (2013.01); *C02F 2103/06* (2013.01)

(58) Field of Classification Search
CPC ... E21B 43/305; B09C 1/002; B09C 2101/00; C02F 2103/06; C02F 1/46; C02F 1/32; C25B 9/00
See application file for complete search history.

(56) References Cited

U.S. PATENT DOCUMENTS

| | | | |
|---|---|---|---|
| 2008/0041732 A1* | 2/2008 | Herzog | B09C 1/002 205/746 |
| 2011/0024361 A1* | 2/2011 | Schwartzel | C02F 1/46109 210/739 |
| 2013/0026108 A1* | 1/2013 | Yager | C02F 1/36 210/748.04 |

* cited by examiner

*Primary Examiner* — Cameron J Allen
(74) *Attorney, Agent, or Firm* — Bond Schoeneck & King, PLLC; George McGuire

(57) ABSTRACT

Ex situ remediation technology has been the primary method for treating groundwater contaminated with poly- and perfluoroalkyl substances. These pump and treat systems are expensive and energy intensive. To address the need for effective in situ remediation technology, a reactor to be used within a subsurface well has been developed. The reactor allows for contaminant destruction methods such as ultrasound to be used in situ. This invention eliminates the need for pumps and aboveground treatment. In addition it produces no waste products that must be treated further.

20 Claims, 2 Drawing Sheets

Angle view, front and bottom

Front face

View of inner face of end cap

IN SITU IN-LINE REACTOR FOR REMEDIATION OF GROUNDWATER CONTAMINANTS

CROSS-REFERENCE TO RELATED APPLICATION

The present application relates and claims priority to U.S. Provisional Application Ser. No. 62/619,671, filed Jan. 19, 2018, the entirety of which is hereby incorporated by reference.

BACKGROUND OF INVENTION

1. Field of the Invention

This invention relates to a system for and a method of in-situ remediation of contaminated groundwater.

2. Description of the Related Art

Remediation of groundwater contaminants can be performed in situ or ex situ. In situ can refer to where the remediation is performed in place, underground where the contaminants are found at the site, contrary to ex situ where contaminated water is pumped and cleaned elsewhere, off site. Ex situ remediation technology has been the primary method for treating groundwater contaminated with poly- and perfluoroalkyl substances. These pump and treat systems are energy intensive due to continuous pumping, trucking carbon offsite, and offsite incineration. The latter two steps could spread contamination offsite, thus increasing liability. Finally, these processes are expensive due to energy used for pumping and carbon replacement that occurs every 6 months to 1 year. For example, a former Air Force base is budgeting for annual carbon replacement of 20,000 lbs per filter and four filters were proposed (Weston and Sampson, 2017). 1 lb of carbon costs approximately $1.40 thus 80,000 lbs annually is $112,000 (USD). In the case of per- and polyfluoroalkyl substances (PFAS contaminants, for example perfluorooctanesulfonate (PFOS) and perfluorootanoic acid (PFOA), further ex situ pyrolysis is often required to fully dispose of the material. Additionally, ex situ treatments require energy to operate pumps to remove the water from the aquifer for treatment.

SUMMARY OF THE INVENTION

To address the need for effective in situ remediation technology a reactor has been developed that is inserted into a well allowing contaminant destruction methods such as, for example, ultrasound to be used in situ. This invention eliminates the need for pumps and above-ground treatment. In addition, it produces no waste products that must be treated further.

In an aspect of the invention, an in situ reactor system comprises a treatment reactor that is positioned in a subsurface well; a treatment device operably attached to said reactor; and a controller operably connected to the treatment device. When the controller is actuated, the treatment device will emit energy that has remediation effects.

In an embodiment, the treatment device is at least one piezoelectric transducer, and the controller is an ultrasonic generator.

In an embodiment, the frequency of the ultrasonic generator is 430 kHz.

In an embodiment, the frequency of the ultrasonic generator is 1 MHz.

In an embodiment, the frequency of the ultrasonic generator sweeps between frequencies in the range of 430 kHz and 1 MHz.

In an embodiment, the in situ reactor system further comprises a solar powered energy source for providing power to the generator.

In an embodiment, at least one piezoelectric transducer comprises a plurality of transducers housed within an assembly.

In an embodiment, the treatment device comprises electrodes.

In an embodiment, the treatment device comprises solid amendments to chemically oxidize contaminants.

In an embodiment, the treatment device comprises solid amendments to chemically reduce (direct or free radical) contaminants.

In an embodiment, the treatment device comprises a source of light to generate photons of energy that breaks down contaminants.

In an embodiment, the treatment device comprises an electrical energy source is used within the reactor to convert a supplied vapor phase to a highly reactive plasma phase that break down contaminants.

In an aspect of the invention, a method of remediating groundwater contaminants comprises the steps of positioning a treatment reactor in a subsurface well; attaching a treatment device to the reactor; and connecting a controller to the treatment device, wherein when the controller is actuated, the treatment device emits energy sufficient to remediate the groundwater.

In an embodiment, the treatment device is at least one piezoelectric transducer.

In an embodiment, the controller is an ultrasonic generator operably connected to the at least one transducer, wherein when the ultrasonic generator is turned on, the at least one transducer emits high frequency sound waves.

DESCRIPTION OF THE DRAWINGS

The present invention will be more fully understood and appreciated by reading the following Detailed Description in conjunction with the accompanying drawings, in which.

DETAILED DESCRIPTION OF THE INVENTION

An in situ in-line reactor is intended to be placed in a section 100 of a well (horizontal or other orientation) (or any other device that captures and funnels water which for purposes of this application will be generically referred to as a well.). The in-line reactor has a remediation technology integrated in it. One example of the remediation technology is sonolysis. Sonolysis can be achieved by directing ultrasonic energy into water, including groundwater. In one embodiment, piezoelectric transducers are physically connected to an ultrasonic generator, which is above the ground. The ultrasonic generator is preferably with frequencies of 430 kHz to 1 MHz, or with a sweep setting that sweeps within this frequency range. When the generator is turned on, the transducers will emit sound waves into groundwater, which has a remediation effect. The sound waves are preferably high frequency sound waves. One of the targeted contaminants is highly stable PFAS, including PFOS and PFOA.

As alternatives to sonolysis, the reactor could also incorporate other treatment modalities, such as: Electrochemical, Oxidation (simple and advanced), Reduction, Photolysis/photochemical (including uv), or Plasma.

In an electrochemical reaction the reactor would include electrodes therein with an above ground power source, and may also include catalysts. Such treatment causes direct or electrocatalytic oxidation of contaminants in the groundwater.

In an oxidation modality (simple and advanced), the reactor would use solid amendments to chemically oxidize (direct or free radical) contaminants (with or without solid phase catalysts).

In a reduction modality (simple and advanced), the reactor would use solid amendments to chemically reduce (direct or free radical) contaminants (with or without solid phase catalysts).

In a photolysis/photochemical modality (including uv)—a source of light is used within the reactor, and it would include an above ground power source, to generate photons of energy that break down contaminants.

In a plasma modality, an electrical energy source is used within the reactor, with above ground power supply, to convert a supplied vapor phase to a highly reactive plasma phase that break down contaminants.

Figure 1:
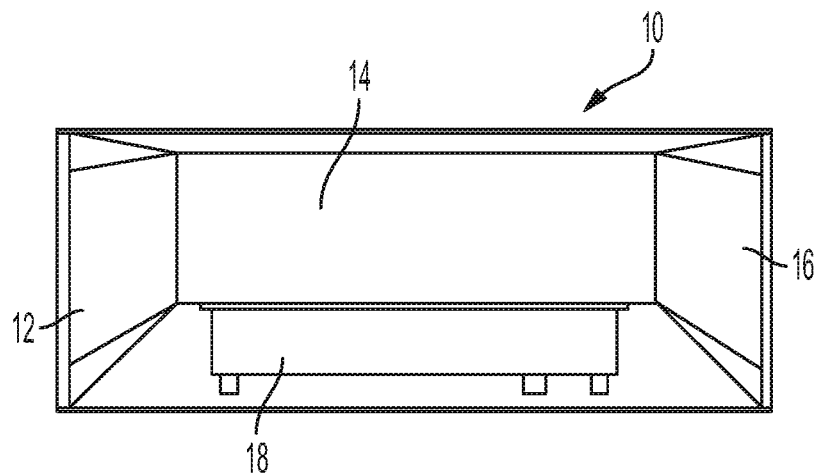
FIG. 1 is an illustration of an in situ reactor system for remediation of groundwater contaminants, in accordance with an embodiment.
Figure 2:
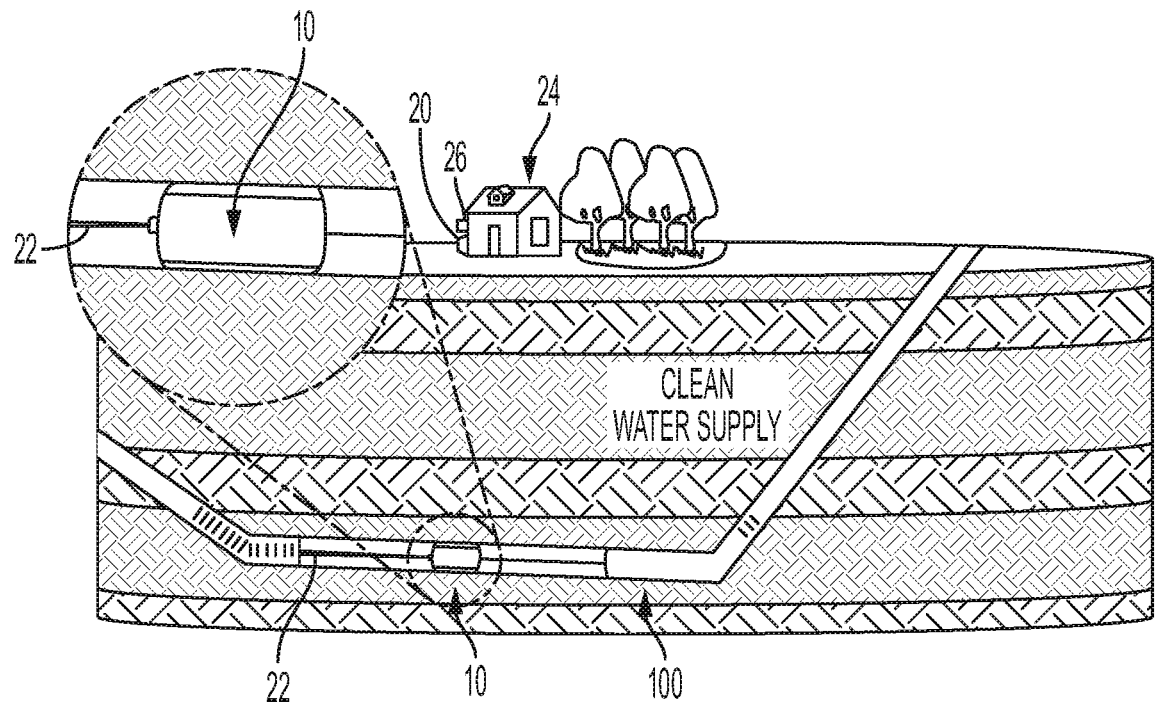
FIG. 2 is an illustration of a plurality of piezoelectric transducers attached to a reactor within a horizontal well underground, in accordance with an embodiment.
Figure 3:
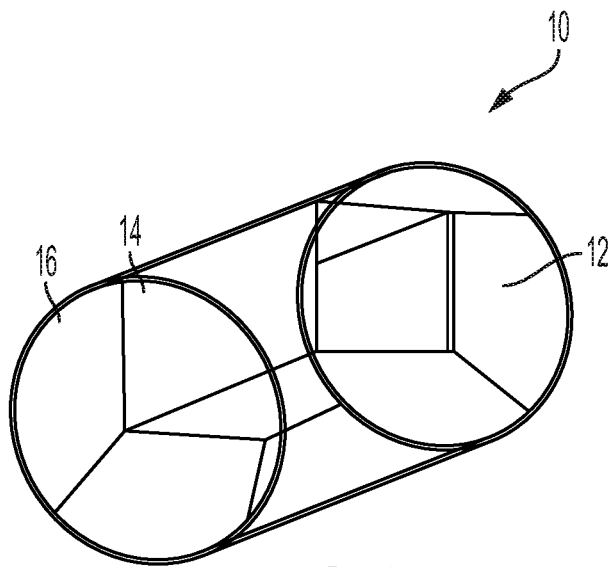
FIG. 3 is a perspective view of an in situ reactor system for remediation of groundwater contaminants, in accordance with an embodiment.
Figure 4:
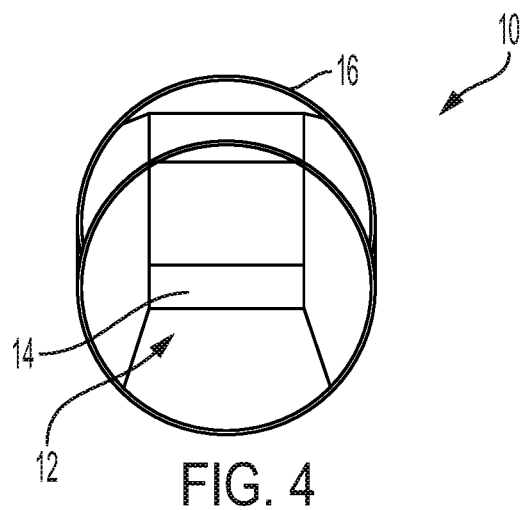
FIG. 4 is a front elevation view of an in situ reactor system for remediation of groundwater contaminants, in accordance with an embodiment.
Figure 5:
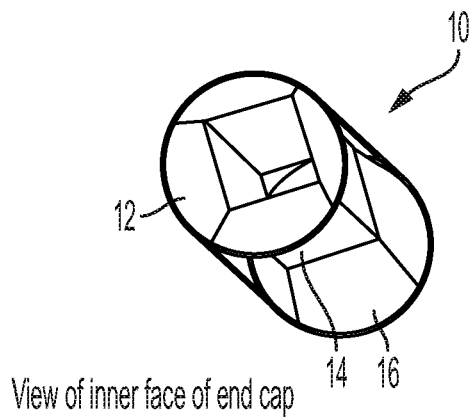
FIG. 5 is a perspective view of an in situ reactor system for remediation of groundwater contaminants, in accordance with an embodiment.

In one embodiment, as shown in FIG. 1 and FIG. 2, an in situ reactor system 10 comprises a converging inlet funnel 12 that fluidly leads into a reaction tank 14, and an outflowing control funnel 16 that carries the treated water out of the reactor into the surrounding environment. A transducer assembly 18 (or at least one individual transducer) is operably attached to reaction tank 14, and an ultrasonic generator 20 is electrically connected via a wire 22 to assembly 18 to provide the power to activate the transducers. The piezoelectric transducer(s)/transducer assembly 18 is below the groundwater surface. When the ultrasonic generator 20 is turned on, the piezoelectric transducer(s) 18 will produce high frequency sound waves that resolve contaminants in the groundwater. System controls are housed in a convenient location to manually access, such as at 24, which is also where the generator 20 is powered and controlled. Solar cells, batteries, AC power, natural gas, or other power source 26 can be used to supply power to generator 20.

The two primary problems addressed by the invention are A) breaking down perfluorooctanoic acid (PFOA) and perfluorooctane sulfonate (PFOS), both of which have previously been noted for their persistence in the environment; and B) the longstanding government interest in using in situ remediation methods to replace current ex situ methods. The invention addresses problem A) by providing the significant energy required to break down PFOS, PFOA, and other, per- and polyfluoroalkyl substances (PFASs). This further addresses the goal of remediating PFAS contaminated groundwater around the United States. PFOS and PFOA have been exceptionally difficult to breakdown because of the strong C—F bonds. Other methods are able to capture the compounds for eventual combustion but result in waste products. Bioremediation does not provide the energy necessary to significantly reduce concentrations of these contaminants. The invention addresses problem B) as the invention is intended for in situ use rather than ex situ. This will decrease energy used, as only the generator needs to be operated. Flow to the reactor is passive. There is also an option for incorporation of solar energy to power the generator, depending on final energy requirements.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. An in situ reactor system for remediation of groundwater contaminants, comprising:
   a. a flow-through treatment reactor that is positioned in a subsurface horizontal well having a downgradient portion and that includes an inlet through which groundwater passing through the well will pass and enter the treatment reactor, and an outlet through which ground water exiting the reactor will pass back into the downgradient portion of the well;
   b. a treatment device operably attached to said reactor; and
   c. a controller operably connected to the treatment device and that is selectively actuable to actuate the treatment device and treat the groundwater within the treatment reactor after it passes through the inlet and prior to it exiting through the outlet, whereby the groundwater is treated within the treatment reactor.

2. The in-situ reactor system of claim 1, wherein the treatment device comprises at least one piezoelectric transducer.

3. The in-situ reactor system of claim 2, wherein the controller comprises an ultrasonic generator operably connected to the at least one piezoelectric transducer used to break down contaminants.

4. The in situ reactor system of claim 3, wherein the frequency of said ultrasonic generator is 430 kHz.

5. The in situ reactor system of claim 3, wherein the frequency of said ultrasonic generator is 1 MHz.

6. The in situ reactor system of claim 3, wherein the frequency of said ultrasonic generator comprises a sweep setting between 430 kHz and 1 MHz.

7. The in situ reactor system of claim 1, further comprising a solar powered energy source for providing power to the generator.

8. The in situ reactor system of claim 2, wherein the at least one piezoelectric transducer comprises a plurality of transducers housed within an assembly.

9. The in-situ reactor system of claim 1, wherein the treatment device comprises electrodes used to electrochemically break down contaminants.

10. The in-situ reactor system of claim 1, wherein the treatment device comprises solid amendments to chemically oxidize direct of free radical contaminants.

11. The in-situ reactor system of claim 1, wherein the treatment device comprises solid amendments to chemically reduce (direct or free radical) contaminants.

12. The in-situ reactor system of claim 1, wherein the treatment device comprises a source of light to generate photons of energy that breaks down contaminants.

13. The in-situ reactor system of claim 1, wherein the treatment device comprises an electrical energy source to convert a supplied vapor phase to a highly reactive plasma phase within the reactor that breaks down contaminants.

14. A method of remediating groundwater contaminants, comprising the steps of: a. positioning a flow-through treatment reactor in a subsurface horizontal well such that water flowing through the well will pass into, through and out of the reactor b. attaching a treatment device to the reactor; and c. connecting a controller to the treatment device, wherein when the controller is actuated on, the treatment device actively remediates the groundwater while it is passing through the reactor.

15. The method according to claim 14, wherein the treatment device comprises at least one piezoelectric transducer.

16. The method according to claim 15, wherein the controller comprises an ultrasonic generator operably connected to the at least one transducer, wherein when the ultrasonic generator is turned on, the at least one transducer emits high frequency sound waves.

17. The method according to claim 15, wherein the transducers are packaged within an assembly.

18. The method of claim 16, comprising the further step of setting the frequency of said ultrasonic generator to 430 kHz.

19. The method of claim 16, comprising the further step of setting the frequency of said ultrasonic generator to 1 MHz.

20. The method of claim 16, comprising the further step of setting the frequency of said ultrasonic generator to a sweep setting between 430 kHz and 1 MHz.

* * * * *